(12) United States Patent
Hartmann et al.

(10) Patent No.: US 10,086,650 B2
(45) Date of Patent: Oct. 2, 2018

(54) WHEEL HUB

(71) Applicants: Georg Fischer GmbH, Mettmann (DE); Georg Fischer Automobilguiss GmbH, Singen (DE); Georg Fischer Automotive (Kunshan) Co. Ltd., Kunshan (CN)

(72) Inventors: Stephan Hartmann, Gottmadingen (DE); Roger Kupferschmid, Hemishofen (CH); Gian Braun, Rheinau (CH); Dominik Mahnig, Schaffhausen (CH)

(73) Assignees: GF Casting Solutions Mettmann GmbH (DE); GF Casting Solutions Singen GmbH (DE); GF Casting Solutions Kunshan Co. Ltd. (CN)

( * ) Notice: Subject to any disclaimer, the term of this patent is extended or adjusted under 35 U.S.C. 154(b) by 158 days.

(21) Appl. No.: 15/333,837

(22) Filed: Oct. 25, 2016

(65) Prior Publication Data

US 2017/0136816 A1 May 18, 2017

(30) Foreign Application Priority Data

Nov. 18, 2015 (EP) .................................... 15195160

(51) Int. Cl.
*B60B 27/02* (2006.01)
*B60B 27/00* (2006.01)

(52) U.S. Cl.
CPC .......... *B60B 27/02* (2013.01); *B60B 27/0052* (2013.01); *B60B 2310/202* (2013.01);
(Continued)

(58) Field of Classification Search
CPC ................ B60B 27/02; B60B 27/0052; B60B 2900/311; B60B 2310/202; B60B 2900/111; B60Y 2200/14
(Continued)

(56) References Cited

U.S. PATENT DOCUMENTS

| 7,111,911 B2* | 9/2006 | Baumgartner ........ F16D 65/123 188/218 XL |
| 2014/0197676 A1* | 7/2014 | Wiechmann ........ B60B 27/0057 301/105.1 |

FOREIGN PATENT DOCUMENTS

| CN | 203780219 U | 8/2014 |
| DE | 10201400945 A1 | 1/2015 |

(Continued)

OTHER PUBLICATIONS

European Search Report (in German) dated May 24, 2016 for EP Application No. 15195160.5 (without English translation) (8 pages).

*Primary Examiner* — S. Joseph Morano
*Assistant Examiner* — Jean W Charleston
(74) *Attorney, Agent, or Firm* — Harness, Dickey & Pierce, P.L.C.

(57) ABSTRACT

An wheel hub made from cast material, in particular for commercial vehicles, comprising a wheel hub body, wherein the wheel hub body consists of the axially successive sections of an outer extension section, a neck section and preferably a brake disc section, further comprising a wheel flange, wherein the wheel flange is formed integrally on the wheel hub body, preferably in the region between the outer extension section and the neck section, and a through hole, wherein the through hole extends axially through the entire wheel hub body, wherein the outer extension section has an inner sleeve and a reinforcing skeleton, wherein the rein-
(Continued)

Figure 1:
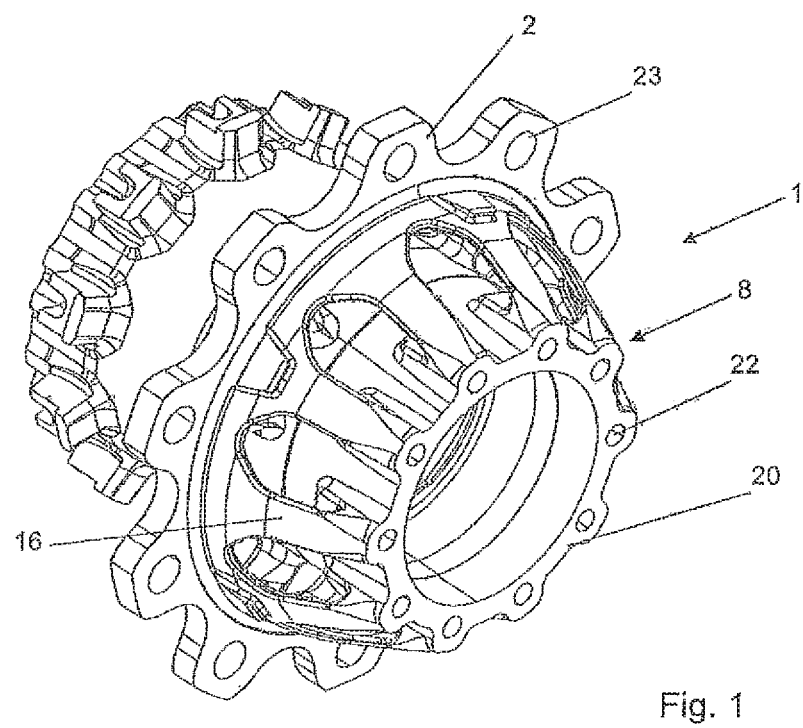

forcing skeleton and the inner sleeve are arranged coaxially, and the reinforcing skeleton surrounds the inner sleeve.

10 Claims, 3 Drawing Sheets

(52) U.S. Cl.
 CPC .... *B60B 2900/111* (2013.01); *B60B 2900/311* (2013.01); *B60Y 2200/14* (2013.01)

(58) Field of Classification Search
 USPC ............................... 301/105.1, 110.5, 124.1
 See application file for complete search history.

(56) References Cited

FOREIGN PATENT DOCUMENTS

| | | | | |
|---|---|---|---|---|
| EP | 0133922 | A2 | 3/1985 | |
| EP | 2572900 | A1 | 3/2013 | |
| FR | 1010066 | A * | 6/1952 | ............. B60B 37/04 |

\* cited by examiner

WHEEL HUB

CROSS-REFERENCE TO RELATED APPLICATIONS

This application claims the benefit and priority of EP 15 195 160.5 filed Nov. 18, 2015. The entire disclosure of the above application is incorporated herein by reference.

FIELD

The invention relates to a wheel hub made from cast material, in particular for commercial vehicles, comprising a wheel hub body, wherein the wheel hub body consists of the axially successive sections of an outer extension section, a neck section and preferably a brake disc section, further comprising a wheel flange, wherein the wheel flange is formed integrally on the wheel hub body, preferably in the region between the outer extension section and the neck section, and a through hole, wherein the through hole extends axially through the entire wheel hub body.

BACKGROUND

Wheel hubs of this kind are used on driven and also on non-driven axles of vehicles, especially commercial vehicles, which requires that the wheel hub have a high strength, and this, in turn, requires massive designs which have a high weight since they are generally produced from cast material or as a forging.

EP 2 572 900 A1 discloses a cast wheel hub, which has the disadvantage of high weight owing to its massive design.

Another disadvantage of such wheel hubs is furthermore that the heat generated is difficult to dissipate owing to the closed and compact designs. This can result in overheating of the wheel bearings, which have a low thermal stability.

EP 0 133 922 A2 discloses a corresponding lightweight wheel hub, which reduces the weight of the wheel hub and nevertheless ensures strength. There, however, there is the problem of unfavourable heat dissipation.

DE 10 2014 009 454 A1 describes a possible design for a wheel hub, which has a reduced weight and also provides heat dissipation by means of the radial projections arranged on the circumference.

SUMMARY

It is an aspect of the disclosure to propose a wheel hub which has a reduced weight but nevertheless does not have to sacrifice any strength and which must have improved heat dissipation.

According to a feature of the invention, this aspect is achieved by virtue of the fact that the outer extension section has an inner sleeve and a reinforcing skeleton, wherein the reinforcing skeleton and the inner sleeve are arranged coaxially, and the reinforcing skeleton surrounds the inner sleeve.

The wheel hub is preferably made of cast material and can be used for driven and non-driven axles. The wheel hub according to the invention is preferably used on commercial vehicles, such as lorries, buses, semitrailer combinations etc.

The wheel hub has a wheel hub body which can be divided into a plurality of sections, although the entire wheel hub is, of course, an integral structure or is designed as a casting.

The axially successive sections into which the wheel hub can be divided are an outer extension section, a neck section and, preferably on the opposite side of the outer extension section, a brake disc section. In the installed state in the vehicle, the brake disc section is oriented in the direction of the centre of the vehicle and serves to accommodate the brake disc, for which purpose there are various brake disc receptacles and the invention is not restricted only to the variant shown.

Arranged between the sections of the outer extension section and the neck section in the axial direction is the wheel flange, which is used to attach the rim. This is moulded or cast on the wheel hub body since, as already mentioned, the wheel hub is a single piece.

A through hole extends in the axial direction through the entire wheel hub or wheel hub body.

Depending on the use or area of use, a wheel bearing receptacle can be arranged in the through hole to enable the bearings to be arranged therein and the wheel hub to be supported on the axle, although other configurations are also conceivable.

In the installed state of the wheel hub, the outer extension section is oriented toward the outside of the vehicle, i.e. a rim is attached to the outside of the wheel flange, preferably by means of bolts in the wheel flange holes provided for that purpose.

As already mentioned, the outer extension section has an inner sleeve and a reinforcing skeleton, wherein both are arranged coaxially. Moreover, the reinforcing skeleton surrounds the inner sleeve and, as a result, it is possible to make the wall thickness of the inner sleeve relatively thin while nevertheless ensuring right angles between the axis of the wheel hub and the wheel flange, even under high loads, and that the wheel flange does not bend relative to the perpendicularly extending axis or wheel hub body, despite the inner sleeve having such thin walls. Thus, the reinforcing skeleton serves to stiffen the wheel hub.

The reinforcing skeleton is formed integrally on the outer circumference of the inner sleeve in the axially outer region or on the side of the inner sleeve oriented towards the outside of the vehicle, and the other side of the reinforcing skeleton is formed integrally on the outside of the wheel flange, wherein, here too, the "outside" refers to the outside of the vehicle.

Owing to the fact that the reinforcing skeleton and the inner sleeve are joined or brought together in the axially outer region, integrally formed portions are formed, wherein a plurality of integrally formed portions is arranged along the outer circumference of the inner sleeve. The integrally formed portions preferably extend in a regular pattern over the circumference of the inner sleeve.

Ribs extend from the integrally formed portions in the direction of the outside of the wheel flange, said ribs forming the reinforcing skeleton inter alia.

The ribs are likewise arranged around the circumference of the inner sleeve since, as already mentioned, they extend out of the integrally formed portions. The ribs widen towards the outside of the wheel flange and join together before joining integrally with the outside of the wheel flange to form a continuous ring, which then joins integrally with the outside of the wheel flange. As a result, the reinforcing skeleton surrounds the inner sleeve and they are arranged coaxially and concentrically with respect to one another.

The reinforcing skeleton has a conical profile and, accordingly, this also means that the individual ribs, which are unsupported between the two attachment points, on one side the integrally formed portion in the outer axial region of the inner sleeve and on the other side the transition to the continuous ring, which then joins integrally with the outside of the wheel flange, and are not connected to the inner sleeve over their extent. As a result, an all-round channel is formed between the outer surface of the inner sleeve and the inner surface of the reinforcing skeleton or the ribs. Since this channel is connected to the passages in the wheel flange, this allows good air flow and serves for heat dissipation.

DRAWINGS

Figure 2:
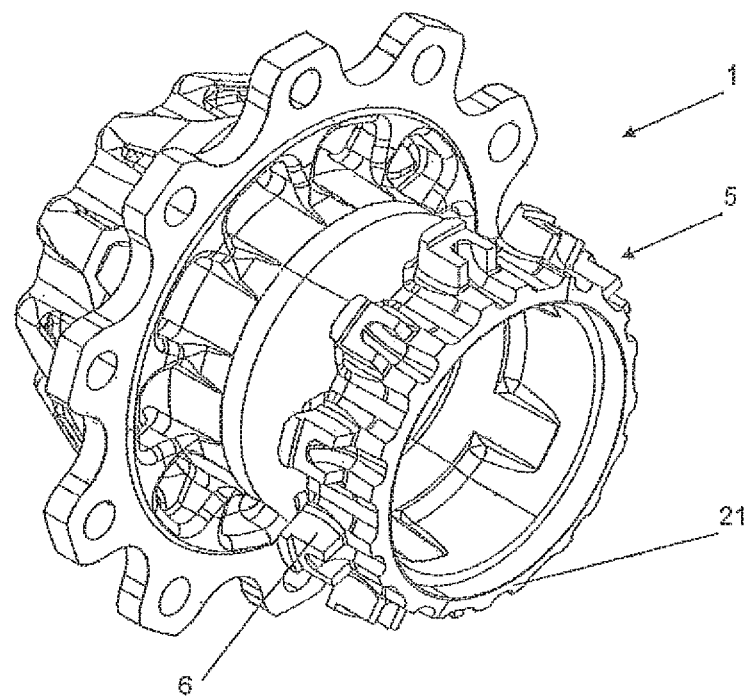
Figure 3:
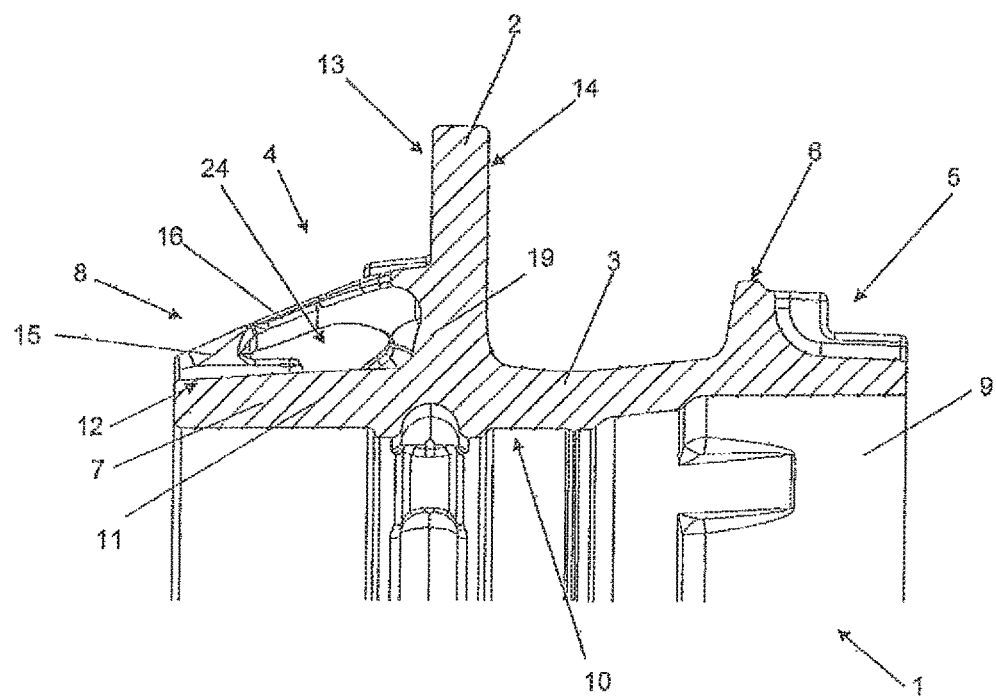
Figure 4:
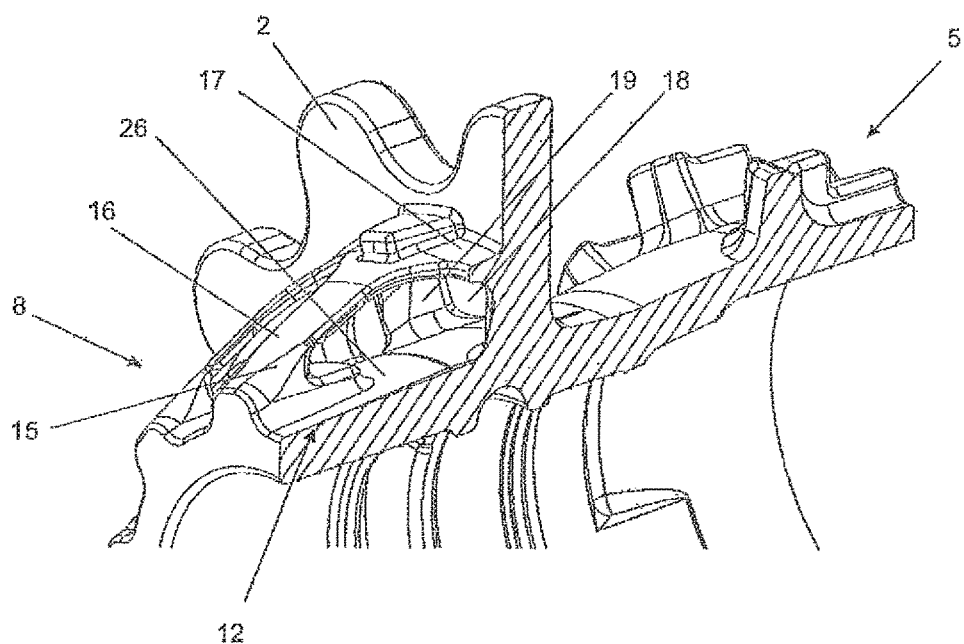
Figure 5:
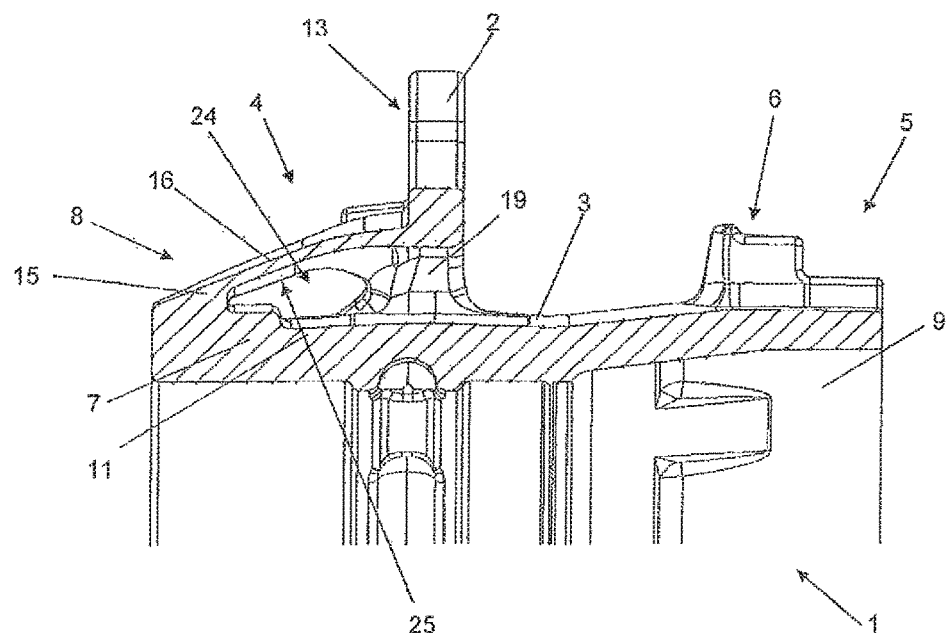
Figure 6:
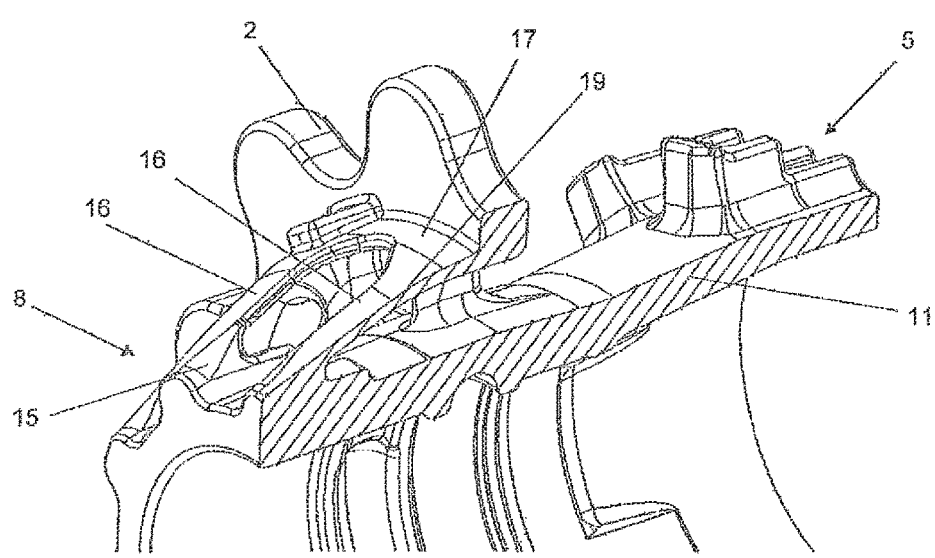

An illustrative embodiment of the invention is described by means of the figures, although the invention is not restricted only to the illustrative embodiment. Of the figures:

FIG. 1 shows a three-dimensional view of a wheel hub according to the invention, wherein the wheel hub face oriented towards the outside of the vehicle faces forwards, FIG. 2 shows a three-dimensional view of a wheel hub according to the invention, wherein the face oriented towards the inside of the vehicle faces forwards, FIG. 3 shows a two-dimensional view of a longitudinal section through a wheel hub according to the invention, wherein the section runs between two ribs, FIG. 4 shows a three-dimensional view of a longitudinal section through a wheel hub according to the invention, wherein the section runs between two ribs, FIG. 5 shows a two-dimensional view of a longitudinal section through a wheel hub according to the invention, wherein the section runs along a rib, and FIG. 6 shows a three-dimensional view of a longitudinal section through a wheel hub according to the invention, wherein the section runs along a rib.

DETAILED DESCRIPTION

FIGS. 1 and 2 show the wheel hub 1 according to the invention in three dimensions. In FIG. 1, the wheel hub 1 is oriented as though looking at the wheel of a vehicle from the outside. In FIG. 2, the inward-oriented side of the wheel hub faces forwards. The wheel hub 1 according to the invention is produced from cast material and is preferably used for commercial vehicles. The outer face 20 has holes 22, which are made in the face 20 only after the casting process, as are the through holes 23 for attaching a rim.

FIG. 3 shows the wheel hub 1 according to the invention in longitudinal section, wherein the section runs between two ribs 16 of the reinforcing skeleton 8, this being easily visible in FIG. 4. The wheel hub 1 according to the invention comprises a wheel hub body 11, wherein this can be divided into sections, even if the wheel hub 1 is an integrally cast part. The wheel hub body 11 has an outer extension section 4, which is oriented in the direction of the outside of the vehicle. Adjoining this is the neck section 3, which is preferably followed by the brake disc section 5. Of course, the wheel hub body 11 can also be constructed differently, and this should be matched to the vehicle.

The brake disc (not shown) is attached to the brake section 5 by means of the brake receptacle 6, although other versions of attachment are also conceivable. The through hole 9 passes through the entire wheel hub 1 or wheel hub body 11. In the embodiment shown, the through hole 9 has wheel bearing receptacles 10 to accommodate the bearings therein and to support the wheel hub 1 on the vehicle axle.

Of course, other embodiments are also conceivable, especially since the wheel hub 1 according to the invention can be used for driven and for non-driven axles.

The wheel flange 2 for attaching the wheel is arranged in the region between the outer extension section 4 and the neck section 3, wherein the wheel flange 2 is formed integrally on the wheel hub body 11 via webs 19, passages 18 thereby being formed between the webs 19, this being easily visible in FIGS. 5 and 6 since, there, the longitudinal section passes through a rib 16 of the reinforcing skeleton 8. In the embodiment shown, the wheel flange 2 is of corrugated design at the outer circumference in order to save weight here too. Of course, other outer contours, e.g. a simple circular shape, are also possible.

The outer extension section 4 adjoins the neck section 3. This section 4 has an inner sleeve 7, which is surrounded by the concentrically and coaxially extending reinforcing skeleton 8. This means that integrally formed portions 15 of the reinforcing skeleton 8 are formed integrally on the outer axial region 12 of the inner sleeve 7, from which portions the ribs 16 of the reinforcing skeleton 8 extend. The reinforcing skeleton 8 has a conical profile and extends as far as the outside of the wheel flange 13. The ribs 16 of the reinforcing skeleton 8 widen at the circumference until they merge ahead of the outside of the wheel flange 13 to form a continuous ring 17, wherein the widening of the rib 16 does not have to take place in a constant manner; on the contrary, the ribs 16 can merge more or less abruptly just ahead of the continuous ring 17, as can be seen from the figures. By virtue of the fact that the ribs 16 are arranged only on the integrally formed portions 15, which are preferably arranged in a regular pattern on the circumference of the inner sleeve 7, and are attached via the continuous ring 17, which is formed integrally on the outside of the wheel flange 13, and otherwise are unsupported, a channel 24 is formed between the outer surface 26 of the inner sleeve 7 and the inside 25 of the ribs 16 or of the reinforcing skeleton 8, wherein the channel 24 runs all the way around between the reinforcing skeleton 8 and the inner sleeve 7. The channel 24, together with the passages 18 in the wheel flange 5, allows good heat dissipation by a possible air flow.

By means of the reinforcing skeleton 8, it is now ensured that tilting of the wheel flange 2 relative to the axis or wheel hub body 11 extending perpendicularly thereto is made impossible, even under high loads, since the reinforcing skeleton 8 forms a reinforcement in this region and nevertheless allows a lightweight version of the wheel hub 1. As a result, it is possible to dispense with thick walls for the wheel bearing body 11, especially in the outer extension section 4.

What is claimed is:

1. A wheel hub made from cast material comprising a wheel hub body, wherein the wheel hub body consists an axially successive sections of an outer extension section, a neck section and a brake disc section, the wheel hub further comprising a wheel flange, wherein the wheel flange is formed integrally on the wheel hub body, in the region between the outer extension section and the neck section, and a through hole, wherein the through hole extends axially through the entire wheel hub body, wherein the outer extension section has an inner sleeve and a reinforcing skeleton, wherein the reinforcing skeleton and the inner sleeve are arranged coaxially, and the reinforcing skeleton surrounds the inner sleeve.

2. The wheel hub according to claim 1, wherein the reinforcing skeleton is formed integrally on the outer circumference of the inner sleeve in the axially outer region of the outer extension section and on the outside of the wheel flange.

3. The wheel hub according to claim 1, wherein the reinforcing skeleton has integrally formed portions on the outer circumference of the inner sleeve, in the axially outer region of the outer extension section, wherein a plurality of integrally formed portions are arranged along the outer circumference of the inner sleeve.

4. The wheel hub according to claim 1, wherein the reinforcing skeleton has ribs, wherein the ribs extend out of the integrally formed portions as far as the outside of the wheel flange.

5. The wheel hub according to claim 4, wherein the ribs widen in the direction of the outside of the wheel flange and merge to form a continuous ring, wherein the continuous ring is formed integrally on the outside of the wheel flange.

6. The wheel hub according to claim 1, wherein the reinforcing skeleton extends conically from the axially outer region on the outer circumference of the inner sleeve to the outside of the wheel flange.

7. The wheel hub according to claim 1, wherein the wheel flange is formed integrally on the wheel hub body by means of webs, wherein passages are formed between the webs along the circumference of the wheel hub body.

8. The wheel hub according to claim 7, wherein the conical profile of the reinforcing skeleton extends in a continuous manner to the inner sleeve.

9. The wheel hub according to claim 1, wherein the ribs of the reinforcing skeleton are unsupported between the integrally formed portions and the continuous ring.

10. The wheel hub according to claim 1, wherein a channel is formed between the outer surface of the inner sleeve and the inner surface of the reinforcing skeleton or inner surfaces of the ribs.

* * * * *